(12) United States Patent
Hori

(10) Patent No.: US 8,964,217 B2
(45) Date of Patent: Feb. 24, 2015

(54) INFORMATION PROCESSING SYSTEM AND METHOD FOR ACQUIRING WORKFLOW FROM MANAGEMENT APPARATUS USING USER TERMINAL ADDRESS

(75) Inventor: Seijiro Hori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 66 days.

(21) Appl. No.: 13/325,200

(22) Filed: Dec. 14, 2011

(65) Prior Publication Data
US 2012/0154842 A1 Jun. 21, 2012

(30) Foreign Application Priority Data

Dec. 20, 2010 (JP) .................................. 2010-282803

(51) Int. Cl.
*G06K 15/00* (2006.01)
*G06F 3/12* (2006.01)
(Continued)

(52) U.S. Cl.
CPC ............ *G06F 3/1257* (2013.01); *G06F 3/1205* (2013.01); *G06F 3/1268* (2013.01); *G06F 3/129* (2013.01); *H04N 1/00244* (2013.01); *H04N 1/00949* (2013.01); *H04N 1/00965* (2013.01); *H04N 1/00973* (2013.01); *H04N 1/32122* (2013.01); *G06F 3/1222* (2013.01); *G06F 3/1238* (2013.01); *G06F 3/1275* (2013.01); *H04N 2201/001* (2013.01); *H04N 2201/0094* (2013.01); *H04N 2201/3208* (2013.01)
USPC ........................................ 358/1.15; 358/1.16

(58) Field of Classification Search
CPC ..... G06F 3/129; G06F 3/1205; G06F 3/1222; G06F 3/1224; G06F 3/1238; G06F 3/1239; G06F 3/1257; G06F 3/1268; G06F 3/1275; H04N 1/00949; H04N 1/00965; H04N 1/00973; H04N 1/32122; H04N 2201/3208; H04N 2201/001; H04N 2201/0094
See application file for complete search history.

(56) References Cited

U.S. PATENT DOCUMENTS

| | | | |
|---|---|---|---|
| 2003/0163556 A1 | 8/2003 | Haneda | |
| 2007/0035766 A1* | 2/2007 | Yamamura | 358/1.15 |
| 2007/0086051 A1* | 4/2007 | Kunori | 358/1.15 |

(Continued)

FOREIGN PATENT DOCUMENTS

| | | | |
|---|---|---|---|
| JP | 11-348386 | * | 12/1999 |
| JP | 2003-258901 | | 9/2003 |

(Continued)

OTHER PUBLICATIONS

Machine translation of JP Pub 2010-140089 to Hakozaki et al.*

(Continued)

*Primary Examiner* — Eric A Rust
*Assistant Examiner* — Haris Sabah
(74) *Attorney, Agent, or Firm* — IPUSA, PLLC

(57) ABSTRACT

An image forming apparatus includes an address obtaining unit configured to obtain address information of a management apparatus for managing definition information of a process flow from an external storage unit; a process information obtaining unit configured to obtain identification information of a process to be performed by the image forming apparatus in the process flow from the management apparatus based on the address information; a function control unit configured to cause the image forming apparatus to perform the process indicated by the identification information; and a linkage unit configured to send a result of the process to the management apparatus.

15 Claims, 13 Drawing Sheets

(51) Int. Cl.
*H04N 1/00* (2006.01)
*H04N 1/32* (2006.01)

(56) References Cited

U.S. PATENT DOCUMENTS

| | | |
|---|---|---|
| 2010/0067035 A1 | 3/2010 | Kawakubo et al. |
| 2011/0295695 A1 | 12/2011 | Ishihara et al. |

FOREIGN PATENT DOCUMENTS

| | | |
|---|---|---|
| JP | 2004-157833 | 6/2004 |
| JP | 2008-204088 | 9/2008 |
| JP | 2010-074302 | 4/2010 |
| JP | 2010-128801 | 6/2010 |
| JP | 2010-140089 | 6/2010 |
| JP | 2010-208309 | 9/2010 |
| JP | 2010-218064 | 9/2010 |
| JP | 2010-219625 | 9/2010 |
| JP | 2011-061543 | 3/2011 |

OTHER PUBLICATIONS

Machine translation of JP 2010-140089 to Hakozaki et al.*
Machine translation of JP 11-348386 to Tanabe et al.*
Japanese Office Action dated Nov. 4, 2014.

* cited by examiner

FIG.6

| TERMINAL NAME | USER ID | ADDRESS REPORT URL |
|---|---|---|
| TERMINAL A1 | USER A | xxxxxxxx |
| TERMINAL A2 | USER A | xxxxxxxx |
| TERMINAL B | USER B | xxxxxxxx |
| .. | .. | .. |

| TERMINAL NAME | USER ID | ADDRESS INFORMATION |
|---|---|---|
| TERMINAL A1 | USER A | yyyyyyy |
| TERMINAL A2 | USER A | yyyyyyy |
| TERMINAL B | USER B | yyyyyyy |
| .. | .. | .. |

| WORKFLOW ID | LINKED FUNCTION IDENTIFIER | DISPLAY NAME | CONFIGURATION INFORMATION | WORKFLOW PROGRAM |
|---|---|---|---|---|
| flow1 | scan | FLOW 1 | ... | ... |
| flow2 | print | FLOW 2 | ... | ... |
| flow3 | scan | FLOW 3 | ... | ... |
| .. | .. | .. | .. | .. |

11

INFORMATION PROCESSING SYSTEM AND METHOD FOR ACQUIRING WORKFLOW FROM MANAGEMENT APPARATUS USING USER TERMINAL ADDRESS

CROSS-REFERENCE TO RELATED APPLICATION

The present application is based upon and claims the benefit of priority of Japanese Patent Application No. 2010-282803, filed on Dec. 20, 2010, the entire contents of which are incorporated herein by reference.

BACKGROUND OF THE INVENTION

1. Field of the Invention

An aspect of this disclosure relates to an image forming apparatus, an information processing system, and an information processing method.

2. Description of the Related Art

Japanese Laid-Open Patent Publication No. 2010-218064 discloses programs (called "widgets") that are installed in a personal computer (PC) connected via a network with an image forming apparatus. The widgets cause the PC to perform process flows in collaboration with the image forming apparatus. For example, a widget enables the PC to perform a process flow using a Web service provided on the Internet on image data obtained by scanning a document by the image forming apparatus.

Meanwhile, in recent years, various types of portable terminals that accept installation of programs have been provided. In such an environment, one user may use multiple terminals including a PC.

When a user desires to enable multiple terminals to perform process flows in collaboration with image forming apparatuses, the user needs to install programs corresponding to the process flows into the respective terminals. Also, when the programs use Web services, the user needs to configure the respective terminals to be able to collaborate with the Web services. For example, to ensure the security, the user needs to make settings for authentication or certification (e.g., digital certificates) between the terminals and the Web services.

SUMMARY OF THE INVENTION

In an aspect of this disclosure, there is provided an image forming apparatus that includes an address obtaining unit configured to obtain address information of a management apparatus for managing definition information of a process flow from an external storage unit; a process information obtaining unit configured to obtain identification information of a process to be performed by the image forming apparatus in the process flow from the management apparatus based on the address information; a function control unit configured to cause the image forming apparatus to perform the process indicated by the identification information; and a linkage unit configured to send a result of the process to the management apparatus.

BRIEF DESCRIPTION OF THE DRAWINGS

FIG. 6 is a table illustrating an exemplary configuration of terminal information stored in a terminal information storing unit;

FIG. 7 is a table illustrating another exemplary configuration of terminal information stored in a terminal information storing unit;

FIG. 11 is a table illustrating an exemplary configuration of workflow information stored in a workflow information storing unit;

DESCRIPTION OF THE PREFERRED EMBODIMENTS

Figure 1:
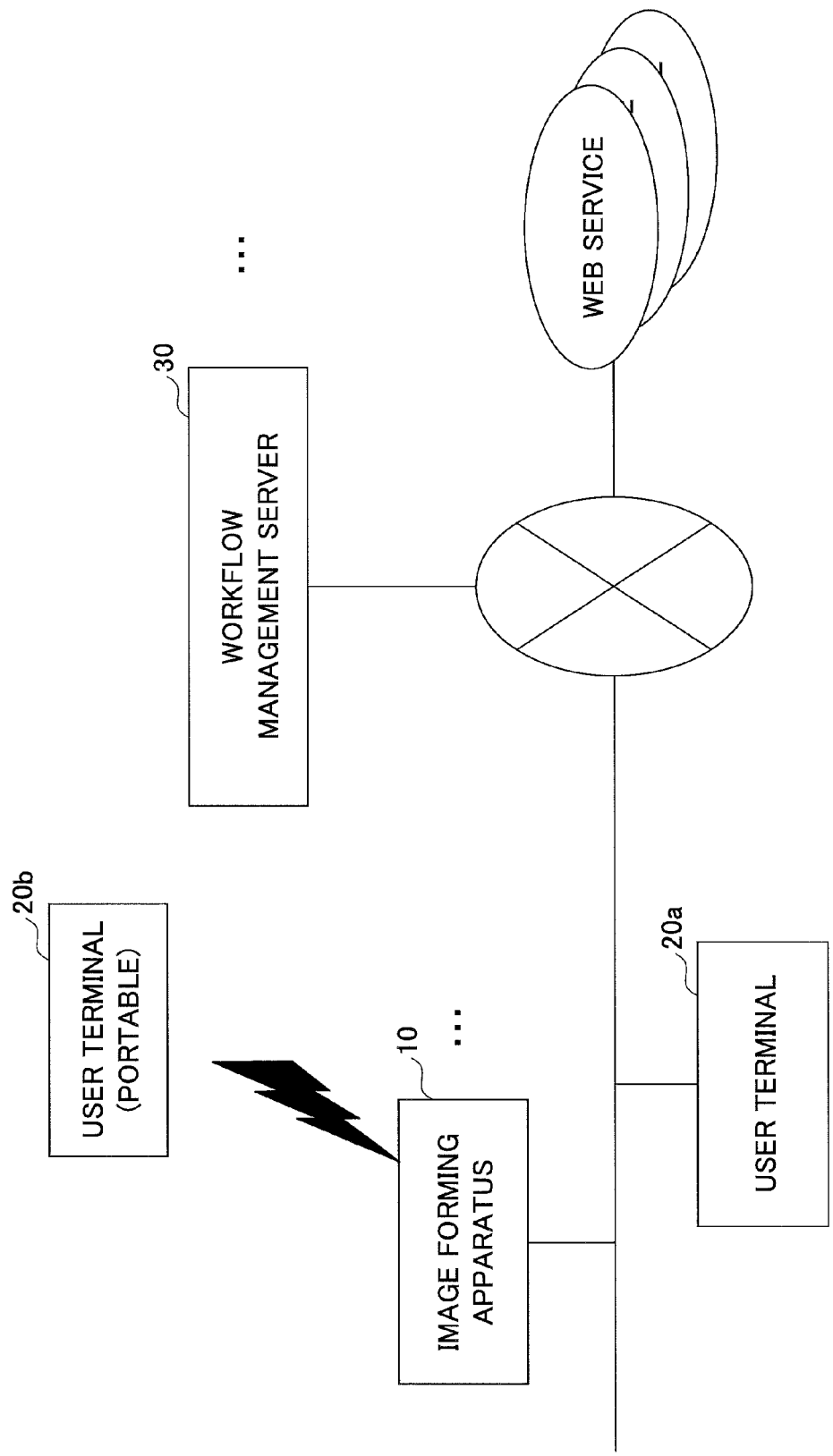
FIG. 1 is a drawing illustrating an exemplary configuration of an information processing system according to an embodiment.

Preferred embodiments of the present invention are described below with reference to the accompanying drawings. FIG. 1 is a drawing illustrating an exemplary configuration of an information processing system 1 according to an embodiment. As illustrated in FIG. 1, the information processing system 1 may include one or more image forming apparatuses 10, one or more user terminals 20 (20a, 20b), and one or more workflow management servers 30 that are connected via a (wired or wireless) network such as a local area network (LAN) or the Internet. Below, the image forming apparatuses 10, the user terminals 20, and the workflow management servers 30 may be expressed in singular forms for descriptive purposes.

The image forming apparatus 10 may be, for example, a multifunction peripheral including two or more functions such as printing, scanning, copying, and facsimile transmission and reception. Alternatively, the image forming apparatus 10 may be an apparatus such as a printer, a scanner, a copier, or a facsimile machine having one function.

The user terminal 20 may be implemented by any type of device that can store and execute a software program and has a communication function. For example, the user terminal 20 may be implemented by a non-portable information processing apparatus such as a desktop personal computer (PC) or a portable information processing apparatus such as a notebook PC, a personal digital assistant (PDA), a cell phone, or a smartphone. In FIG. 1, the user terminal 20a is an example of a non-portable user terminal and the user terminal 20b is an example of a portable user terminal. When distinction is not necessary, the user terminals 20a and 20b may be collectively called the user terminal 20. A storage unit (e.g., a secondary storage unit 202) of the user terminal is an example of an "external storage unit" in the present application.

The workflow management server 30 is a computer that manages information on process flows (workflows) to be performed in collaboration with the image forming apparatus 10 and controls the workflows based on the information. Various Web services provided on the Internet may be used in the workflows managed by the workflow management server 30. The workflow management server 30 is an example of a "management apparatus" in the present application.

Figure 2:
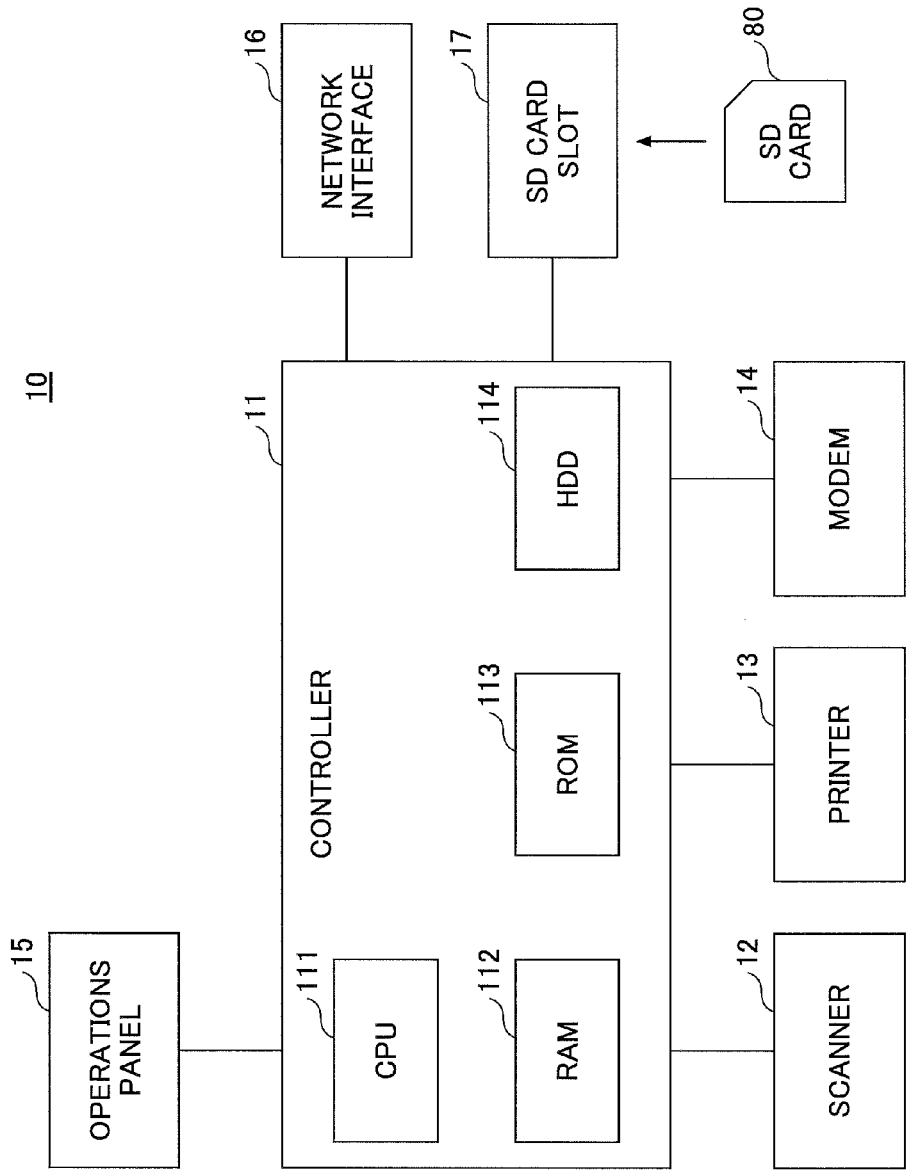
FIG. 2 is a block diagram illustrating an exemplary hardware configuration of an image forming apparatus.

FIG. 2 is a block diagram illustrating an exemplary hardware configuration of the image forming apparatus 10. As illustrated in FIG. 2, the image forming apparatus 10 may include, as hardware components, a controller 11, a scanner 12, a printer 13, a modem 14, an operations panel 15, a network interface 16, and a secure digital (SD) card slot 17.

The controller 11 includes a CPU 111, a RAM 112, a ROM 113, and an HDD 114. The ROM 113 stores, for example, programs and data used by the programs. The RAM 112 is used, for example, as a storage area into which programs are loaded and as a work area for the loaded programs. The CPU 111 executes the programs loaded into the RAM 112 to implement various functions. The HDD 114 stores, for example, programs and data used by the programs.

The scanner 12 is a hardware component for scanning a document to obtain image data. The printer 13 is a hardware component for printing print data on a recording medium such as paper. The modem 14 is a hardware component for connecting the image forming apparatus 10 to a telephone line and is used to send and receive image data for facsimile communications. The operations panel 15 is a hardware component including an input unit such as buttons for receiving user inputs and a display unit such as a liquid crystal display panel. The network interface 16 is a hardware component for connecting the image forming apparatus 10 to a (wired or wireless) network such as a LAN. The SD card slot 17 reads, for example, programs stored in a secure digital (SD) card 80. With the image forming apparatus 10 configured as described above, in addition to the programs stored in the ROM 113, programs stored in the SD card 80 can be loaded into the RAM 112 and executed. Instead of the SD card 80, any other storage medium (e.g., a CD-ROM or a universal serial bus (USB) memory) may also be used for this purpose. That is, a storage medium that can be mounted on the image forming apparatus is not limited to the SD card 80. When a storage medium other than the SD card 80 is used, the SD card slot 17 may be replaced with a hardware component corresponding to the storage medium used.

Figure 3:
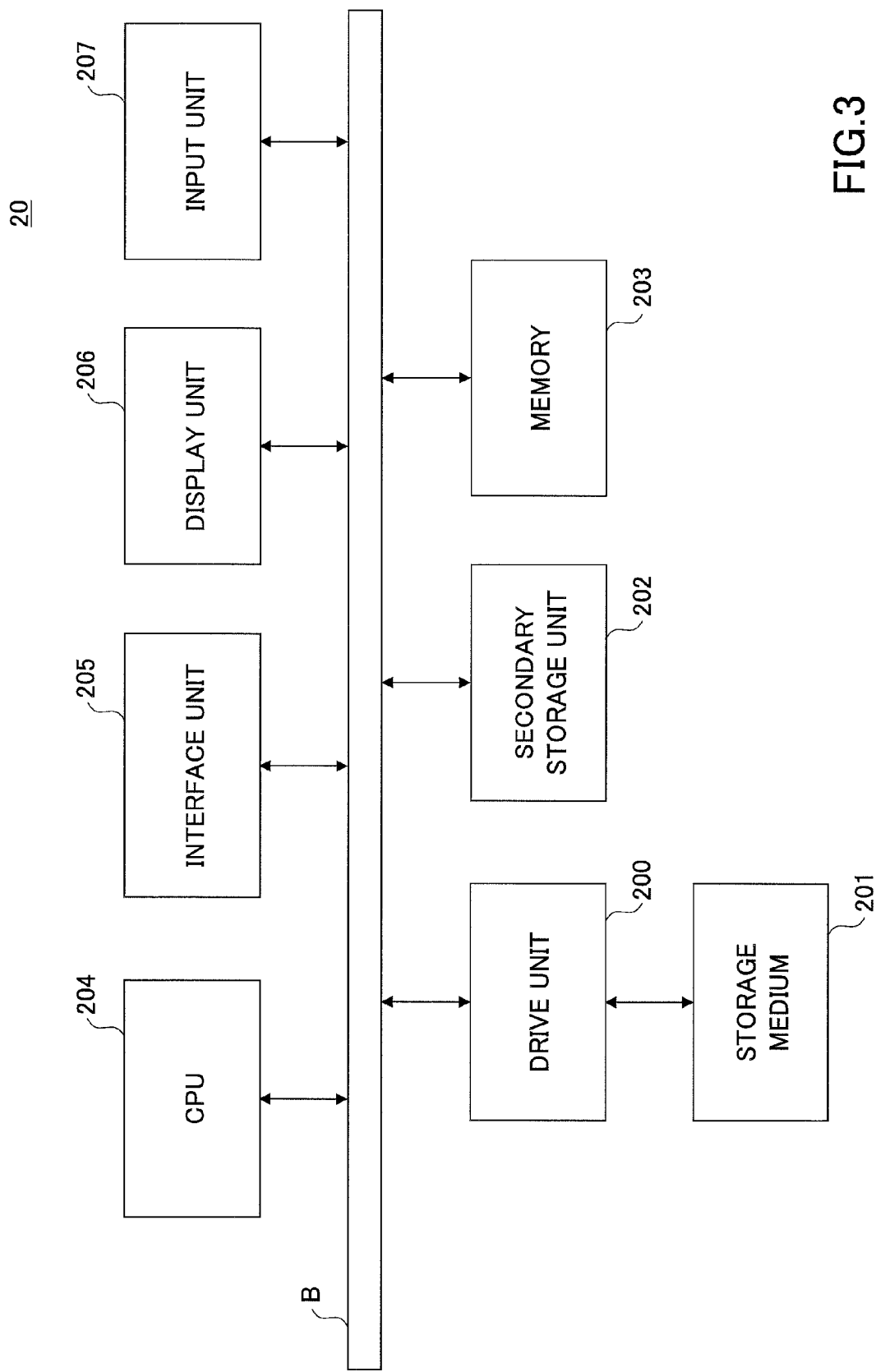
FIG. 3 is a block diagram illustrating an exemplary hardware configuration of a user terminal.

FIG. 3 is a block diagram illustrating an exemplary hardware configuration of the user terminal 20. As illustrated in FIG. 3, the user terminal 20 may include a drive unit 200, a secondary storage unit 202, a memory 203, a CPU 204, an interface unit 205, a display unit 206, and an input unit 207 that are connected to each other via a bus B.

Programs for implementing various processes at the user terminal 20 may be provided via a storage medium 201 such as a CD-ROM or a memory card. When the storage medium 201 storing programs is mounted on the drive unit 200, the programs are read by the drive unit 200 from the storage medium 201 and are installed in the secondary storage unit 202. The programs may not necessarily be installed from the storage medium 201, but may instead be downloaded via a network from another computer. The secondary storage unit 202 stores the installed programs and other necessary files and data.

The memory 203 temporarily stores programs retrieved from the secondary storage unit 202 when the programs are executed. The CPU 204 implements functions of the user terminal 20 according to the programs temporarily stored in the memory 203. The interface unit 205 provides communication interfaces such as a network interface, a universal serial bus (USB) interface, and a wireless interface (e.g., Bluetooth interface). The display unit 206 displays, for example, graphical user interfaces (GUI) output by the programs. The input unit 207 includes, for example, a keyboard, a pointing device such as a mouse, and/or buttons for receiving user inputs.

The workflow management server 30 may also have a hardware configuration as illustrated in FIG. 3. However, the display unit 206 and the input unit 207 are not essential for the workflow management server 30.

Figure 4:
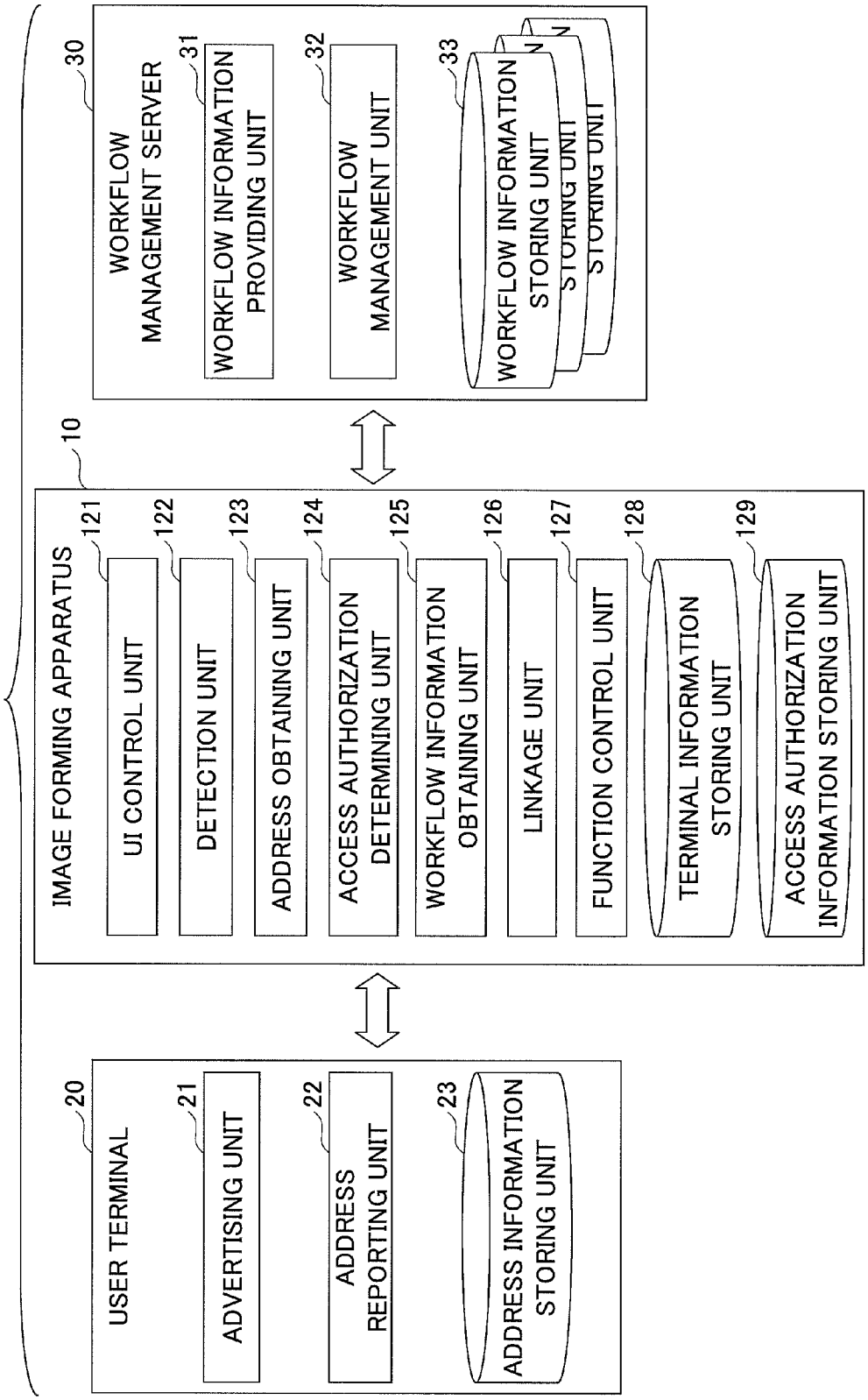
FIG. 4 is a drawing illustrating exemplary functional configurations of a user terminal, an image forming apparatus, and a workflow management server.

FIG. 4 is a drawing illustrating exemplary functional configurations of the user terminal 20, the image forming apparatus 10, and the workflow management server 30. As illustrated in FIG. 4, the user terminal 20 may include an advertising unit 21, an address reporting unit 22, and an address information storing unit 23. The advertising unit 21 and the address reporting unit 22 may be implemented by executing programs installed in the user terminal 20 by the CPU 204. The address information storing unit 23 may be implemented, for example, by a storage area of the secondary storage unit 202.

The advertising unit 21 advertises (broadcasts or multicasts), for example, identification information (e.g., a terminal name) of the user terminal 20 and a user ID of the user using the user terminal 20 via the network.

The address information storing unit 23 stores address information of the workflow management server 30 to be used by the user of the user terminal 20. The address information is identification information such as an IP address or a uniform resource locator (URL) of the workflow management server 30 which is necessary to communicate with the workflow management server 30 via the network.

The address reporting unit 22, in response to a request from the image forming apparatus 10, sends the address information stored in the address information storing unit 23 to the image forming apparatus 10.

The image forming apparatus 10 may include a UI control unit 121, a detection unit 122, an address obtaining unit 123, an access authorization determining unit 124, a workflow information obtaining unit 125, a linkage unit 126, a function control unit 127, a terminal information storing unit 128, and an access authorization information storing unit 129. The UI control unit 121, the detection unit 122, the address obtaining unit 123, the access authorization determining unit 124, the workflow information obtaining unit 125, the linkage unit 126, and the function control unit 127 may be implemented by executing programs installed in the image forming apparatus 10 by the CPU 111. The terminal information storing unit 128 and the access authorization information storing unit 129 may be implemented, for example, by storage areas of the HDD 114.

The UI control unit 121, for example, displays operation screens on the operations panel 15.

The detection unit 122 detects the presence of the user terminal 20 based on an advertisement (or notification) received from the user terminal 20. Also, the detection unit 122 records information (e.g., a user ID and a terminal name) included in the received advertisement in the terminal information storing unit 128.

The address obtaining unit 123 obtains address information of the workflow management server 30 from the user terminal 20. The access authorization determining unit 124 determines whether the access to the workflow management server 30 corresponding to the address information obtained by the address obtaining unit 123 is allowed based on information stored in the access authorization information storing unit 129. The workflow information obtaining unit 125 obtains workflow list information including a list of workflows and configuration information (attribute information) of the workflows from the workflow management server 30 corresponding to the address information obtained by the address obtaining unit 123.

The linkage unit 126 enables the image forming apparatus 10 to collaborate with the workflow management server 30 when a workflow selected by the user is executed.

The function control unit 127 controls execution of a function (e.g., a scanning function or a printing function) of the image forming apparatus 10 used in a selected workflow to be executed.

The access authorization information storing unit 129 stores one or more sets of address information of the workflow management servers 30 that the image forming apparatus 10 is allowed to access (or collaborate with). As described above, the address information of the workflow management server 30 is obtained from the user terminal 20. Here, from the security point of view, it is not preferable to allow the image forming apparatus 10 to access all computers (i.e., all workflow management servers 30). For this reason, the access authorization information storing unit 129 is provided to limit the workflow management servers 30 that the image forming apparatus 10 can access. That is, the image forming apparatus 10 is allowed to access only the workflow management servers 30 corresponding to the address information stored in the access authorization information storing unit 129. Alternatively, in an environment where unlimited access to the workflow management servers 30 is acceptable or where the access of the image forming apparatus 10 to other computers is properly limited by another access control mechanism (e.g., a firewall), the access authorization information storing unit 129 may be omitted.

The workflow management server 30 may include a workflow information providing unit 31, a workflow management unit 32, and a workflow information storing unit(s) 33. The workflow information providing unit 31 and the workflow management unit 32 may be implemented by executing programs installed in the workflow management server 30 by a CPU of the workflow management server 30. The workflow information storing unit 33 may be implemented, for example, by a storage area of a secondary storage unit of the workflow management server 30.

The workflow information providing unit 31 provides workflow list information including a list of workflows registered in the workflow management server 30 to the image forming apparatus 10. The workflow management unit 32 calls (or starts) programs (hereafter called "workflow programs") that implement workflows. The workflow information storing unit 33 stores, for respective workflows, workflow programs and configuration information of the workflows (or the workflow programs). In FIG. 4, multiple workflow information storing units 33 are illustrated. This indicates that the workflow information storing unit 33 is provided for each user.

Exemplary processes in the information processing system 1 are described below. When a user desires to execute a workflow, the user needs to report the presence of the user terminal 20 to the image forming apparatus 10. An exemplary process of reporting the presence of the user terminal 20 to the image forming apparatus 10 is described below.

Figure 5:
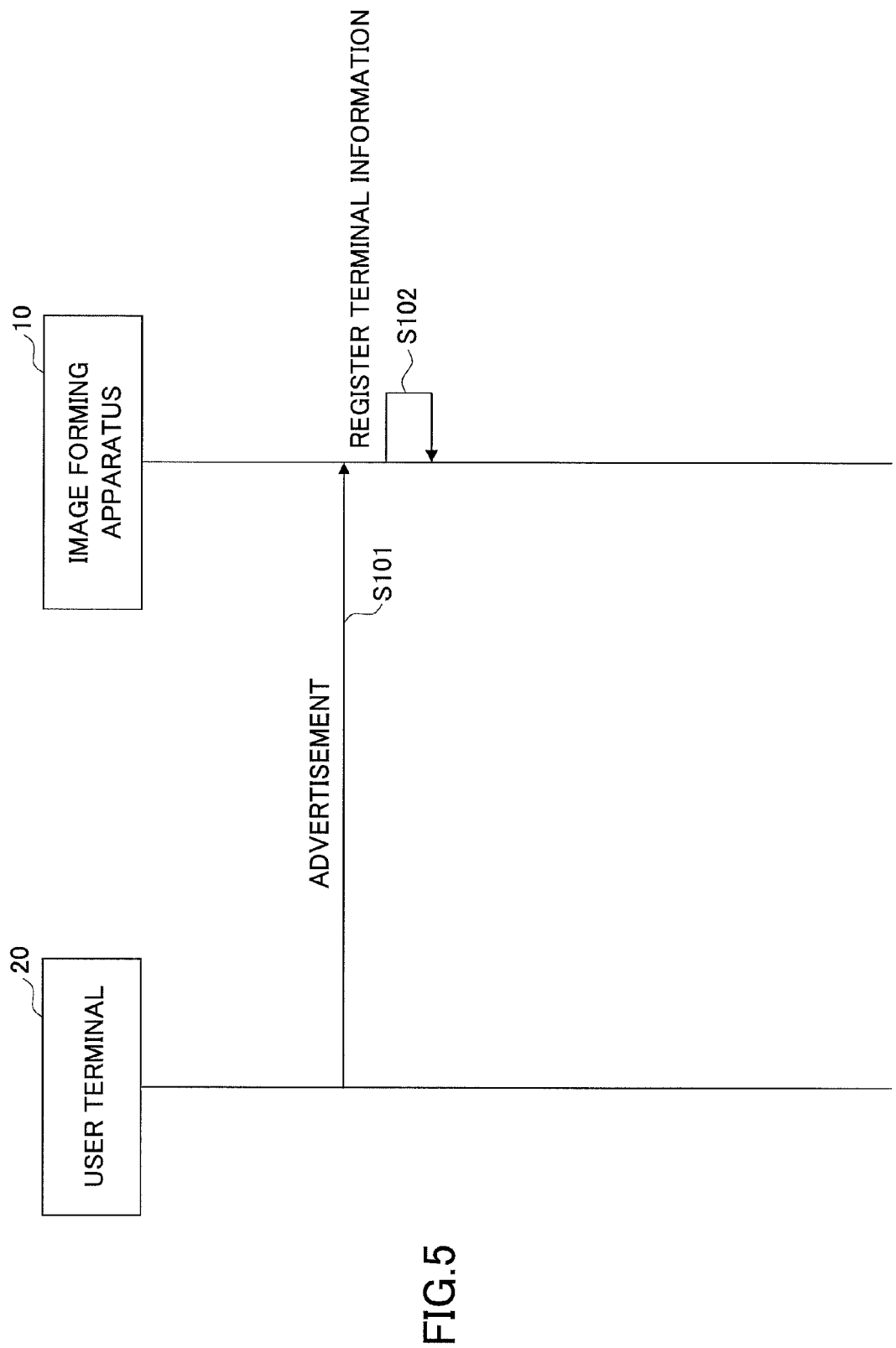
FIG. 5 is a sequence chart illustrating an exemplary process of reporting the presence of a user terminal.

FIG. 5 is a sequence chart illustrating an exemplary process of reporting the presence of the user terminal 20.

When the user enters a predetermined command (or instruction) on the user terminal 20, the advertising unit 21 of the user terminal sends an advertisement via the network (S101). The advertisement may include the terminal name of the user terminal 20, the user ID of the user (logged-in user), and a URL (hereafter called "address report URL") of the address reporting unit 22.

When receiving the advertisement, the detection unit 122 of each image forming apparatus 10 registers information (hereafter called "terminal information") included in the advertisement in the terminal information storing unit 128 (S102).

FIG. 6 illustrates an exemplary configuration of terminal information stored in the terminal information storing unit 128. As illustrated in FIG. 6, the terminal information storing unit 128 stores terminal information including a terminal name, a user ID, and an address report URL for each user terminal 20.

The terminal information of each user terminal 20 is stored (or registered) in the terminal information storing unit 128 through a process as illustrated in FIG. 5. Here, when the user terminal 20a and the user terminal 20b are being used by the same user, the terminal information for the user terminal 20a and the terminal information for the user terminal 20b that include the same user ID are registered in the terminal information storing unit 128.

The terminal information may also be registered in the image forming apparatus 10 using a method other than advertisement (or broadcasting). For example, the terminal information may be registered in a specific image forming apparatus 10 via a unicast. In this case, the IP address of the specific image forming apparatus 10 may be registered beforehand in the user terminal 20 or may be entered by the user when starting the process of FIG. 5, and the advertising unit 21 may be configured to send the terminal information to the registered or entered IP address.

In the case of the portable user terminal 20b, the terminal information may be sent to the image forming apparatus 10 via Bluetooth communications. Bluetooth communications may also be used in steps S204 and S205 of FIG. 8 described later.

The advertisement or the unicast sent in step S101 of FIG. 5 may include the address information stored in the address information storing unit 23 instead of the address report URL. In this case, the terminal information of each user terminal 20 stored in the terminal information storing unit 128 may include the address information of the workflow management server 30.

FIG. 7 is a table illustrating another exemplary configuration of terminal information stored in the terminal information storing unit 128. In this example, the terminal information storing unit 128 stores terminal information including a terminal name, a user ID, and address information (e.g., a URL) of a workflow management server 30 for each user terminal 20.

When the terminal information is registered in the image forming apparatus 10, the user becomes able to execute workflows via the image forming apparatus 10. Then, the user moves to the location where the image forming apparatus 10 is installed. Here, when multiple image forming apparatuses 10 are connected to the network, the same advertisement is received by the image forming apparatuses 10 and the terminal information in the advertisement is registered in the terminal information storing unit 128 of the respective image forming apparatuses 10. Accordingly, in this case, the user can execute workflows at any one of the image forming apparatuses 10.

Next, a process performed according to user operations at the image forming apparatus 10 is described.

Figure 8:
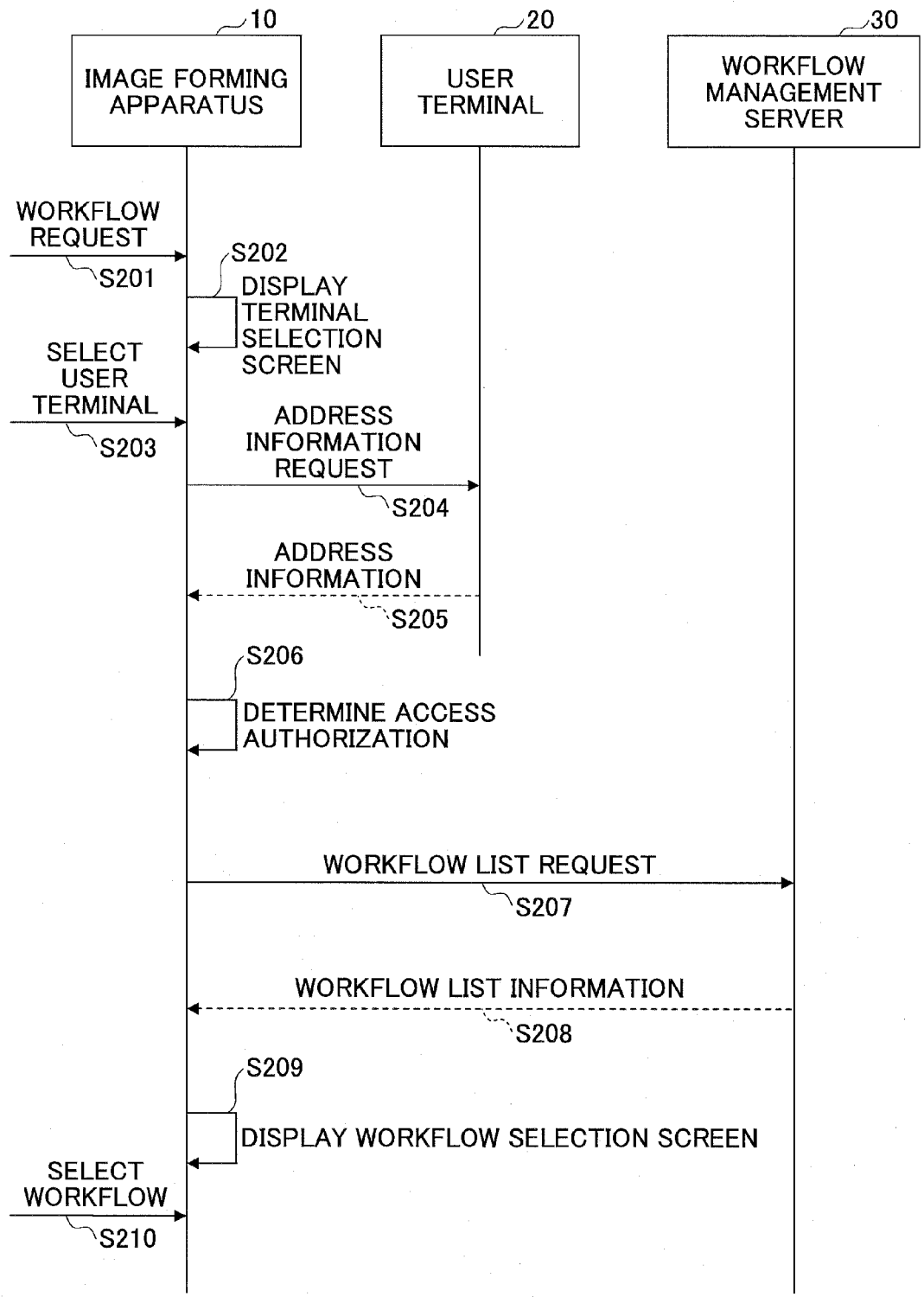
FIG. 8 is a sequence chart illustrating an exemplary process of displaying a list of executable workflows.

FIG. 8 is a sequence chart illustrating an exemplary process of displaying a list of executable workflows.

When a workflow request (a request to use workflows) is input by the user via the operations panel 15 (S201), the UI control unit 121 of the image forming apparatus 10 displays a terminal selection screen on the operations panel 15 based on the terminal information registered in the terminal information storing unit 128 (S202).

Figure 9:
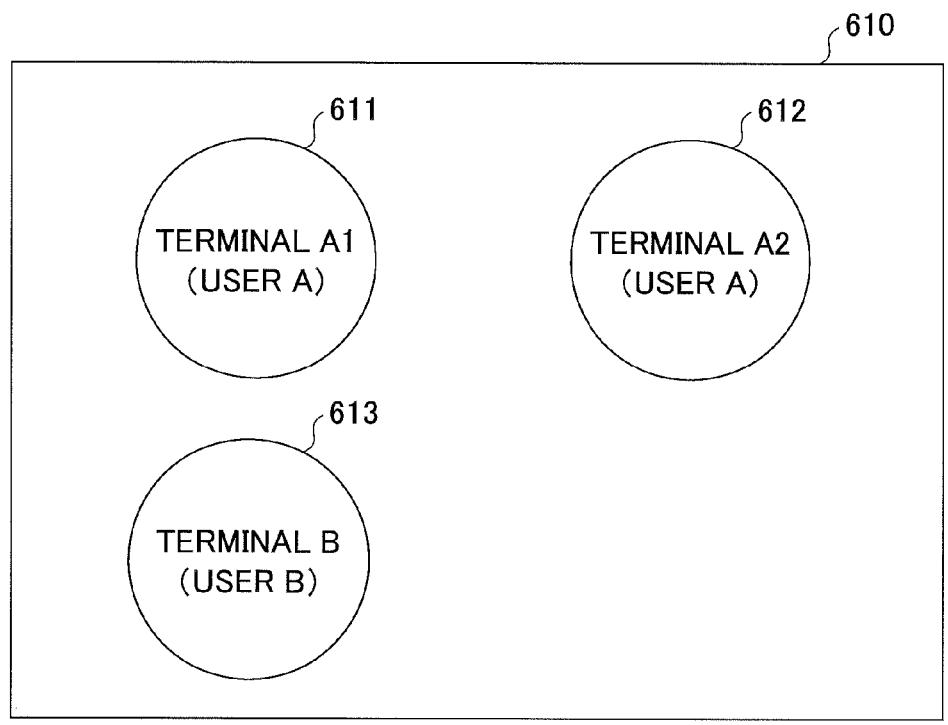
FIG. 9 is a drawing illustrating an exemplary terminal selection screen.

FIG. 9 is a drawing illustrating an exemplary terminal selection screen 610. The terminal selection screen 610 includes buttons for respective user terminals 20. The corresponding terminal name and user ID are displayed on each button. In the example of FIG. 9, the terminal selection screen 610 includes a button 611 corresponding to a terminal A1 being used by user A, a button 612 corresponding to a terminal A2 being user by user A, and a button 613 corresponding to a terminal B being used by user B.

On the terminal selection screen 610, the user selects one of the buttons corresponding to the user terminal 20 and the user ID of the user (S203). When a button is selected, the address obtaining unit 123 obtains an address report URL in the terminal information (hereafter called "current terminal information") corresponding to the selected button from the terminal information storing unit 128. In this exemplary process, it is assumed that the terminal information storing unit 128 stores terminal information as illustrated in FIG. 6.

Next, the address obtaining unit 123 sends a request (address information request) for address information of the workflow management server 30 to the address reporting unit 22 of the user terminal 20 corresponding to the obtained address report URL (S204). In response, the address reporting unit 22 of the user terminal 20 sends the address information stored in the address information storing unit 23 to the address obtaining unit 123 (S205).

Here, if the terminal information storing unit 128 stores terminal information as illustrated in FIG. 7, steps S204 and S205 may be omitted. In this case, when a button is selected on the terminal selection screen 610, the address obtaining unit 123 obtains the address information of the workflow management server 30 from the terminal information storing unit 128.

The access authorization determining unit 124 determines whether the access to the workflow management server 30 corresponding to the obtained address information (hereafter called "target address information") is allowed based on information stored in the access authorization information storing unit 129 (S206).

Figure 10:
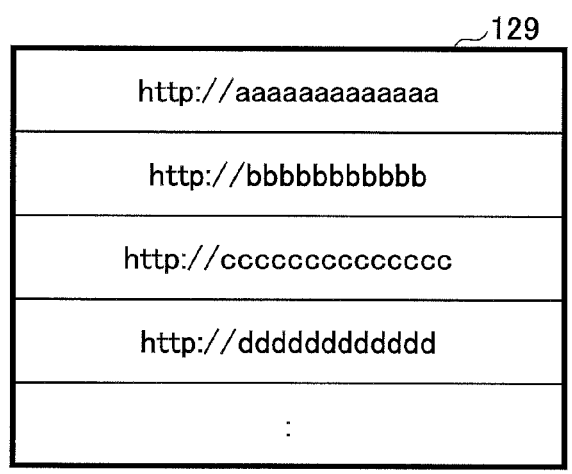
FIG. 10 is a table illustrating exemplary information stored in an access authorization information storing unit.

FIG. 10 is a table illustrating exemplary information stored in the access authorization information storing unit 129. As illustrated in FIG. 10, the access authorization information storing unit 129 stores one or more sets of address information of the workflow management servers 30 that the image forming apparatus 10 is allowed to access. In this example, the address information is represented by URLs.

In step S206 described above, the access authorization determining unit 124 determines whether the target address information matches any one of the sets of address information stored in the access authorization information storing unit 129, i.e., whether the target address information is stored in the access authorization information storing unit 129. If the target address information is stored in the access authorization information storing unit 129, the access authorization determining unit 124 allows the access to the workflow management server 30 corresponding to the target address information. Meanwhile, if the target address information is not stored in the access authorization information storing unit 129, the access authorization determining unit 124 denies (or prevents) the access to the workflow management server 30 corresponding to the target address information.

Alternatively, the access authorization information storing unit 129 may be configured to store one or more sets of address information of the workflow management servers 30 that the image forming apparatus 10 is not allowed to access. In this case, the access authorization determining unit 124 allows the access to the workflow management server 30 corresponding to the target address information if the target address information is not stored in the access authorization information storing unit 129.

If the access to the workflow management server corresponding to the target address information is denied by the access authorization determining unit 124, the UI control unit 121 displays a message indicating that the access has been denied and terminates the process.

Meanwhile, if the access to the workflow management server 30 corresponding to the target address information is allowed by the access authorization determining unit 124, the workflow information obtaining unit 125 sends a request (workflow list request) for workflow list information to the workflow management server 30 corresponding to the target address information (S207). The workflow list request includes a user ID contained in the current terminal information (i.e., the user ID of the user operating the image forming apparatus 10).

In response, the workflow information providing unit 31 of the workflow management server 30 obtains workflow list information from the workflow information storing unit 33 (hereafter called "target workflow information storing unit 33") corresponding to the user ID specified in the workflow list request and sends the workflow list information to the workflow information obtaining unit 125 (S208).

FIG. 11 is a table illustrating an exemplary configuration of workflow information stored in the workflow information storing unit 33. As illustrated in FIG. 11, the workflow information stored in the workflow information storing unit 33 includes, for each workflow, a workflow ID, a linked function identifier, a display name, configuration information, and a workflow program.

The workflow ID is identification information of the corresponding workflow. The linked function identifier is an identifier of a function of the image forming apparatus 10 that is used in the workflow. In the example of FIG. 11, the linked function identifier is "print" or "scan". The linked function identifier "print" indicates the printing function. The linked function identifier "scan" indicates the (image) scanning function. Here, a workflow whose workflow information includes the linked function identifier "print" (i.e., a workflow that uses the printing function of the image forming apparatus 10) is called a "printing workflow". A workflow whose workflow information includes the linked function identifier "scan" (i.e., a workflow that uses the scanning function of the image forming apparatus 10) is called a "scanning workflow". In the present application, the linked function identifier is an example of identification information of a process to be performed by the image forming apparatus 10 in a workflow (or process flow).

The display name is a character string to be displayed as the name of the workflow. In the example of FIG. 11, "flow 1", "flow 2", and "flow 3" are used as display names. However, display names representing processes to be performed in the workflows are more preferable.

The configuration information indicates settings for the workflow. For example, the configuration information of a printing workflow may include parameters of a print job performed in the printing workflow, and the configuration information of a scanning workflow may include parameters of a scan job performed in the scanning workflow.

The workflow program is an entity (a program file) of a program for controlling the workflow.

In the present application, each record (information for each workflow) in the workflow information illustrated in FIG. 11 is an example of definition information of a workflow (or process flow) in the broad sense. Meanwhile, the workflow program is an example of definition information of a workflow (or process flow) in the narrow sense.

Here, it is assumed that the workflow list information sent to the workflow information obtaining unit 125 in step S208 described above includes a workflow ID, a linked function identifier, and a display name for each workflow.

Based on the workflow list information, the UI control unit 121 of the image forming apparatus 10 displays a workflow selection screen on the operations panel 15 (S209).

Figure 12:
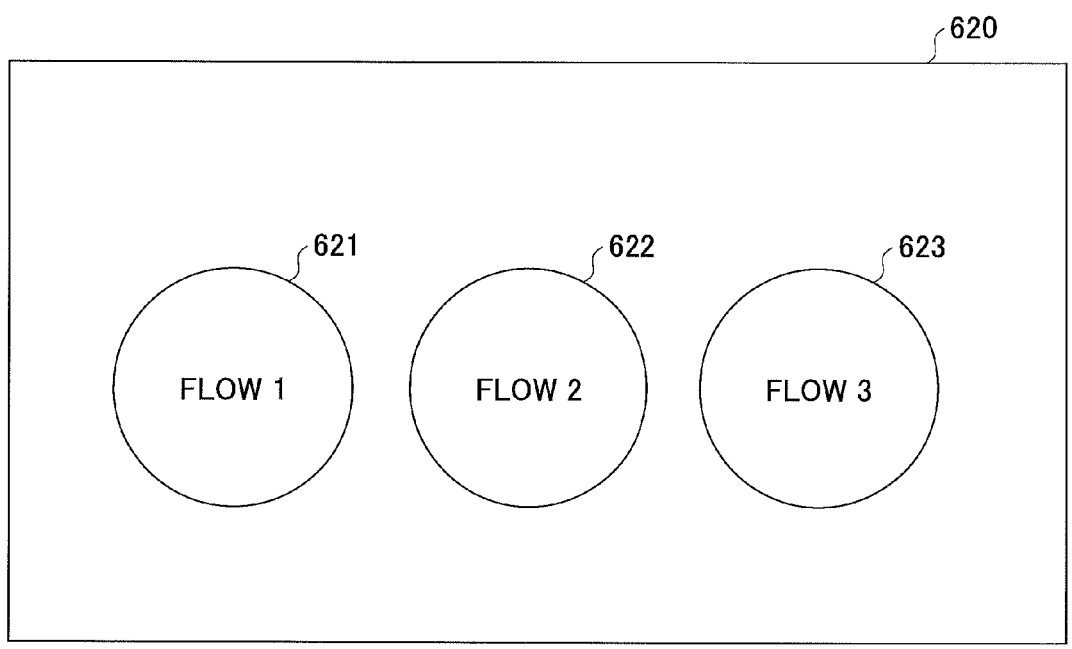
FIG. 12 is a drawing illustrating an exemplary workflow selection screen.

FIG. 12 illustrates an exemplary workflow selection screen 620. On the workflow selection screen 620, buttons (621, 622, 623) corresponding to the workflows included in the workflow list information are displayed. A display name of the corresponding workflow is displayed on each button.

When one of the buttons is selected on the workflow selection screen 620 (S210), the linkage unit 126 of the image forming apparatus 10 performs a process corresponding to the linked function identifier of the workflow (hereafter called "target workflow") associated with the selected button.

Figure 13:
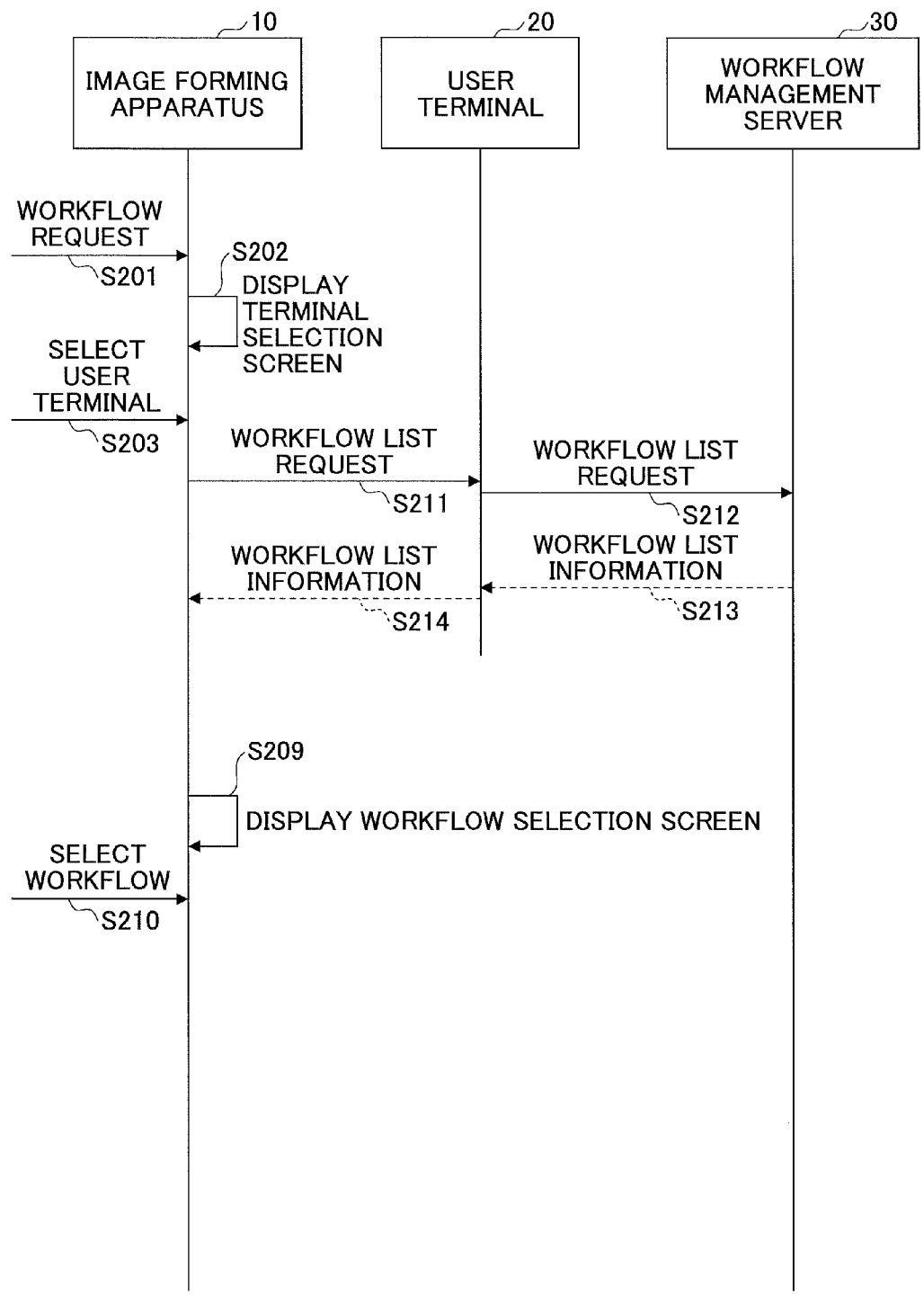
FIG. 13 is a sequence chart illustrating another exemplary process of displaying a list of executable workflows.

The process illustrated in FIG. 8 may be modified as illustrated in FIG. 13.

FIG. 13 is a sequence chart illustrating another exemplary process of displaying a list of executable workflows. The same reference numbers as in FIG. 8 are assigned to the corresponding steps in FIG. 13 and detailed descriptions of those steps are omitted.

In the process of FIG. 13, when a button is selected on the terminal selection screen 610 (S203), the workflow information obtaining unit 125 of the image forming apparatus 10 obtains an address report URL in the terminal information (current terminal information) corresponding to the selected button from the terminal information storing unit 128.

Next, the workflow information obtaining unit 125 sends a request (workflow list request) for workflow list information to the address reporting unit 22 of the user terminal 20 corresponding to the obtained address report URL (S211). The workflow list request includes a user ID contained in the current terminal information. In response, the address reporting unit 22 obtains address information from the address information storing unit 23 and transfers the workflow list request to the workflow management server 30 corresponding to the obtained address information (S212).

In response, the workflow information providing unit 31 of the workflow management server 30 obtains workflow list information from the workflow information storing unit 33 corresponding to the user ID specified in the workflow list request and sends the workflow list information to the address reporting unit 22 (S213).

Then, the address reporting unit 22 transfers the workflow list information to the workflow information obtaining unit 125 of the image forming apparatus 10 (S214).

Thus, in the process of FIG. 13, the user terminal 20, which retains the address information of the workflow management server 30, relays the workflow list request. In this case, whether the access to the workflow management server 30 is allowed may be determined at the user terminal 20.

In the process illustrated in FIG. 8, the role of the user terminal 20 is to report the address information of the workflow management server 30, which the user desires to use, to the image forming apparatus 10. Therefore, the user terminal 20 may be replaced with, for example, a portable storage medium such as an SD card, a USB memory, a CD-ROM, or a contact or non-contact IC card that stores the address information of the workflow management server 30 that the user desires to use. When the portable storage medium is set on (e.g., inserted into or mounted on) the image forming apparatus 10, the address obtaining unit 123 of the image forming apparatus 10 reads the address information from the portable storage medium. In this case, steps S202 and S203 may be omitted. Also in this case, the portable storage medium is an example of an "external storage unit" in the present application.

The image forming apparatus 10 may be configured to allow the user to select either the user terminal 20 or the portable storage medium. For example, the UI control unit 121 may be configured to display the terminal selection screen 610 that includes buttons corresponding to the user terminals 20 that are detected by the detection unit 122 and a button corresponding to a portable storage medium set on the image forming apparatus 10. In this case, the address obtaining unit 123 obtains address information of the workflow management server 30 from the user terminal 20 or the portable storage medium corresponding to a button selected on the terminal selection screen 610.

A process performed after step S210 of FIG. 8 or 13 differs depending on the linked function identifier of the selected workflow (i.e., whether a scanning workflow or a printing workflow is selected). Therefore, exemplary processes of a scanning workflow and a printing workflow are described separately below.

Figure 14:
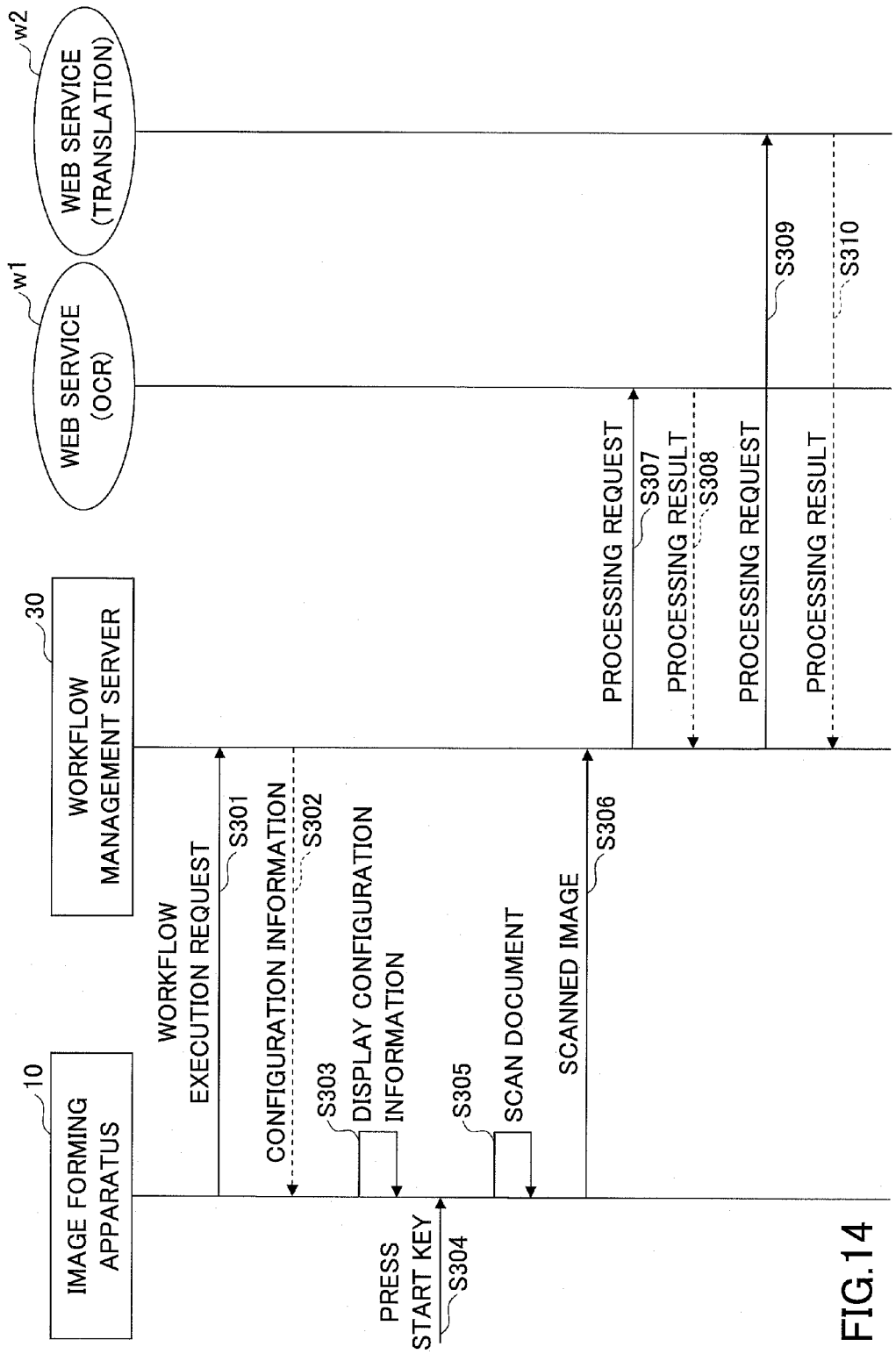
FIG. 14 is a sequence chart illustrating an exemplary process of a scanning workflow.

FIG. 14 is a sequence chart illustrating an exemplary process of a scanning workflow. The workflow management server 30 in FIG. 14 corresponds to the workflow management server 30 the access to which is determined to be allowed in the process of FIG. 8.

In step S301 of FIG. 14, the linkage unit 126 sends a workflow execution request including the workflow ID of a target workflow to the workflow management server 30. In response, the workflow management unit 32 of the workflow management server 30 executes a workflow program corresponding to the workflow ID. When executed, the workflow program sends the configuration information of the target workflow to the linkage unit 126 of the image forming apparatus 10 (S302). In this embodiment, it is assumed that returning the configuration information of a requested workflow in response to a workflow execution request is defined in a scanning workflow program (a workflow program for a scanning workflow) as a protocol or a rule in collaborating with the image forming apparatus 10.

When the configuration information is received by the linkage unit 126, the UI control unit 121 displays, on the operations panel 15, the configuration information and a message requesting the user to set a document to be scanned (S303).

When the user sets a document on the pressing plate or the auto document feeder (ADF) of the scanner 12 and presses a start key (S304), the function control unit 127 causes the scanner 12 to scan the document to obtain image data (hereafter called "scanned image") and stores the scanned image in the RAM 112 or the HDD 114 (S305).

Next, the linkage unit 126 sends the scanned image together with the workflow ID of the target workflow to the workflow management server 30 (S306).

When the scanned image and the workflow ID are received, the workflow management unit 32 of the workflow management server 30 inputs the scanned image to the workflow program corresponding to the workflow ID.

The workflow program performs a process implemented in the workflow program itself on the scanned image. The process performed on the scanned image varies from one workflow program to another. In the example of FIG. 14, the workflow program requests a Web service w1 providing an optical character recognition (OCR) service to perform OCR on the scanned image (S307). The Web service w1 performs OCR on the scanned image to obtain text data and sends the text data to the workflow program (S308). Next, the workflow program requests a Web service w2 providing a translation service to translate the text data (S309). The Web service w2 translates the text data (e.g., from English to Japanese) and sends the translated text data to the workflow program (S310).

Assuming that the translated text data are the final output of the workflow, how to make the translated text data available to the user may also be defined in the workflow program. For example, the workflow program may be configured to upload the translated text data to a predetermined Web server or file server. In this case, the user can download the translated text data from the Web server or the file server. As another example, the workflow program may be configured to send the translated text data to an email address of the user. In this case, the email address may be included, for example, in the configuration information of the target workflow.

The above described workflow, where OCR is performed on a scanned image to obtain text data and the text data are translated, is just an example. As described above, the process performed in a workflow depends on how the workflow program is configured. For example, a workflow program may be configured to use no Web service. Also, image processing (such as a conversion process) to be performed on a scanned image may be implemented in the workflow program.

Figure 15:
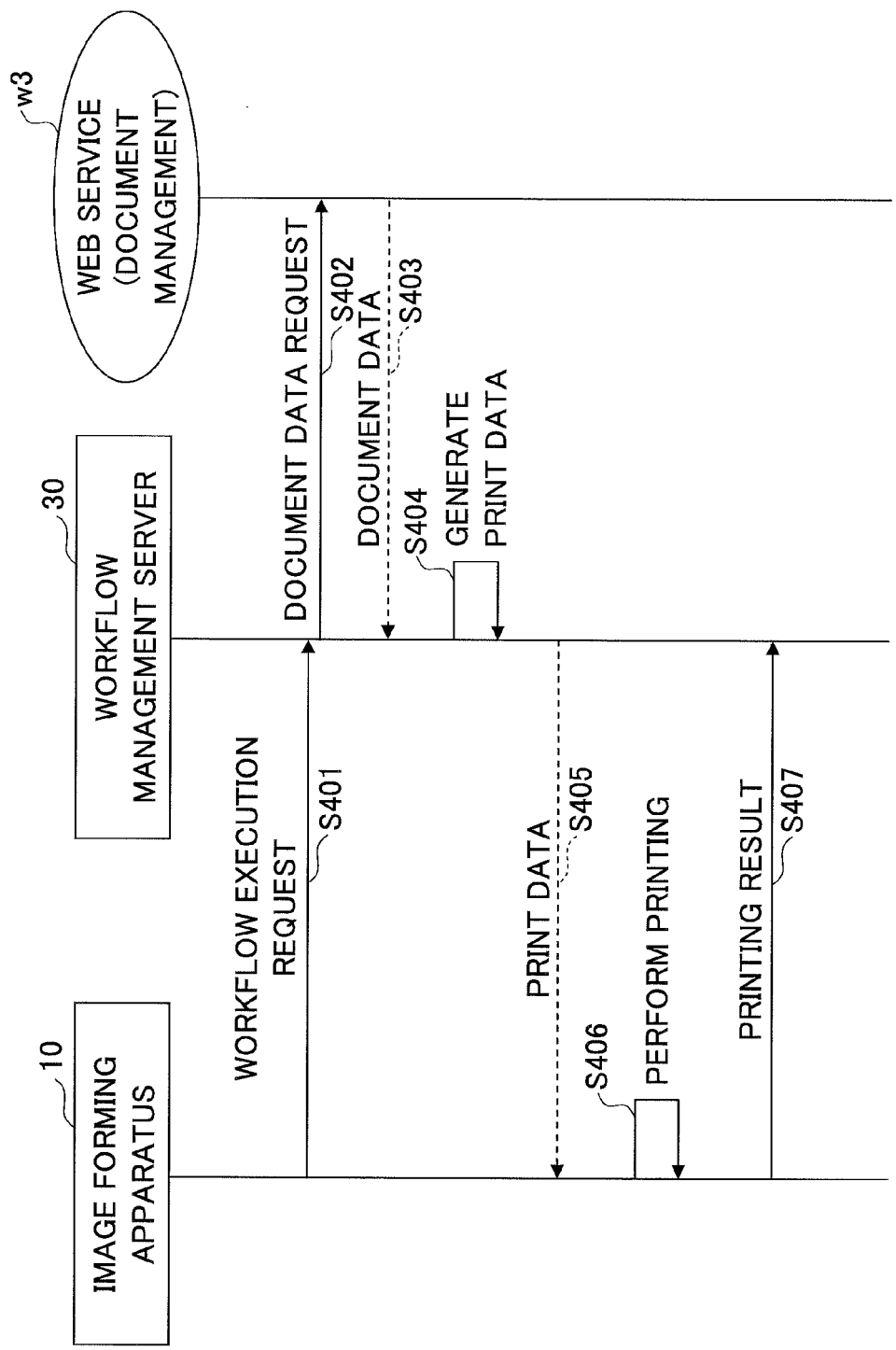
FIG. 15 is a sequence chart illustrating an exemplary process of a printing workflow.

An exemplary printing workflow is described below. FIG. 15 is a sequence chart illustrating an exemplary process of a printing workflow.

In step S401 of FIG. 15, the linkage unit 126 sends a workflow execution request including the workflow ID of a target workflow to the workflow management server 30. In response, the workflow management unit 32 of the workflow management server 30 executes a workflow program corresponding to the workflow ID. When executed, the workflow program sends print data to the linkage unit 126 of the image forming apparatus 10 (S405). In this embodiment, it is assumed that returning print data in response to a workflow execution request is defined in a printing workflow program (a workflow program for a printing workflow) as a protocol or a rule in collaborating with the image forming apparatus 10.

However, how the print data are generated varies from one workflow program to another. In the example of FIG. 15, the workflow program sends a request for document data (document data request) to a Web service w3 providing a document management service (S402). Here, it is assumed that document data have been uploaded by the user to the Web service w3. In this case, the identification information of the document data to be obtained may be included, for example, in the configuration information of the target workflow. The Web service w3 sends requested document data to the workflow program (S403). Next, the workflow program generates print data based on the document data (S404). For example, the workflow program generates the print data using an application program and a printer driver corresponding to the document data. Then, as already described above, the workflow program sends the print data to the linkage unit 126 of the image forming apparatus 10 (S405).

The print data may also be generated through other procedures. For example, the workflow program may be configured to obtain document data from a predetermined folder in the workflow management server 30 and to generate print data based on the obtained document data. As another example, the workflow program may be configured to collect and edit information available on the Internet to create document data and generate print data based on the created document data.

When the print data are received by the linkage unit 126, the function control unit 127 causes the printer 13 to print the print data (S406). As a result, a recording medium (e.g., paper) where an image is formed according to the print data is output from the printer 13. Then, the linkage unit 126 sends a printing result (information indicating whether a printing process has been successfully completed) together with the workflow ID of the target workflow to the workflow management server 30 (S407).

When the printing result and the workflow ID are received, the workflow management unit 32 of the workflow management server 30 inputs the printing result to the workflow program corresponding to the workflow ID. The workflow program may be further configured to perform a process according to the printing result. For example, the workflow program may be configured to send the printing result to the email address of the user or to upload the printing result to a predetermined Web server or file server.

The workflow program may also be configured to record information indicating results of respective steps (e.g., communications with the image forming apparatus 10 and accesses to Web services) performed in a workflow. This may apply to both the scanning workflow and the printing workflow. The recorded information may be provided, for example, via Rich Site Summary (RSS) feeds. In this case, the user can view the recorded information using a widely-available application such as a Web browser or an RSS reader.

As described above, according to an embodiment, execution of a workflow (or a workflow program) that uses the image forming apparatus 10 is controlled by the workflow management server 30. In other words, the image forming apparatus 10 performs a part of a process flow in collaboration with the workflow management server 30 instead of the user terminal 20. With this configuration, the user only needs to configure the workflow management server 30 for execution of workflows (e.g., installation of workflow programs, and settings for authentication or certification with Web services). In other words, even if the user uses multiple user terminals 20, the user does not have to configure the respective user terminals 20 to execute workflow.

Also with the above embodiment, the workflow management server 30 that collaborates with the image forming apparatus 10 is not fixed but is dynamically determined based on address information stored in the user terminal 20 or an external storage medium. Therefore, in an environment where multiple workflow management servers 30 are installed, the user can flexibly select the workflow management server 30 to execute a workflow. Also, the user can use the same workflow management server 30 from different image forming apparatuses 10.

In the above embodiment, it is assumed that a workflow (or a process flow) is controlled by a workflow program. However, a workflow may also be defined by any other means. For example, a workflow may be defined by a text-based language (or text-based information) such as eXtensible Markup Language (XML). In this case, the workflow management unit 32 may be configured to interpret or parse text-based definition information of a workflow and to execute the workflow according to the text-based definition information.

An aspect of this disclosure provides an image forming apparatus, an information processing system, and an information processing method that make it possible to reduce the workload of a user in configuring apparatuses for execution of process flows (or workflows) that use image forming apparatuses.

The present invention is not limited to the specifically disclosed embodiments, and variations and modifications may be made without departing from the scope of the present invention.

What is claimed is:

1. An apparatus that executes at least one process in a process flow, the apparatus comprising:
    a terminal information storing unit configured to store terminal information of at least one of user terminals which stores address information;
    an input unit configured to receive an operation input by a user of the apparatus;
    a process information obtaining unit configured to obtain information of the process flow stored in a management apparatus, accessed based on the address information obtained from the user terminal selected from among the terminal information by the operation received by the input unit;
    a function control unit configured to cause the apparatus to perform at least one process of the process flow; and
    a linkage unit configured to send a result of the process to the management apparatus.

2. The apparatus as claimed in claim 1, further comprising:
    an address obtaining unit configured to obtain the address information of the management apparatus from the user terminal selected by the operation received by the input unit;
    a storage unit configured to store one or more sets of address information; and
    an access authorization determining unit configured to determine whether access to the management apparatus corresponding to the address information obtained by the address obtaining unit is allowed by referring to the sets of address information stored in the storage unit,
    wherein the process information obtaining unit is configured to obtain the information of the process flow from the management apparatus if the access authorization determining unit determines that the access to the management apparatus is allowed.

3. The apparatus as claimed in claim 2, further comprising:
    a detection unit, wherein
    the detection unit is configured to detect the user terminal; and
    the address obtaining unit is configured to obtain the address information from the detected user terminal.

4. The apparatus as claimed in claim 1, wherein when the process indicated by the information of the process flow is a scanning process,
    the function control unit causes the apparatus to scan a document to obtain image data, and
    the linkage unit sends the obtained image data to the management apparatus.

5. The apparatus as claimed in claim 1, wherein when the process indicated by the information of the process flow is a printing process, the function control unit causes the apparatus to perform the printing process based on print data sent from the management apparatus.

6. An information processing system, comprising:
    an apparatus the executes at least one process in a process flow; and
    a management apparatus configured to store and manage information of the process flow,
    wherein the apparatus includes
        a terminal information storing unit configured to store terminal information of at least one of user terminals which stores address information,
        an input unit configured to receive an operation input by a user of the apparatus,
        a process information obtaining unit configured to obtain the information of the process flow, accessed based on the address information obtained from the user terminal selected from among the terminal information by the operation received by the input unit,
        a function control unit configured to cause the apparatus to perform at least one process of the process flow, and
        a linkage unit configured to send a result of the process to the management apparatus.

7. The information processing system as claimed in claim 6, wherein
    the apparatus further includes
        an address obtaining unit configured to obtain the address information of the management apparatus from the user terminal selected by the operation received by the input unit,
        a storage unit configured to store one or more sets of address information, and
        an access authorization determining unit configured to determine whether access to the management apparatus corresponding to the address information obtained by the address obtaining unit is allowed by referring to the sets of address information stored in the storage unit; and
        the process information obtaining unit is configured to obtain the information of the process flow from the management apparatus if the access authorization determining unit determines that the access to the management apparatus is allowed.

8. The information processing system as claimed in claim 7, wherein
    the apparatus further includes a detection unit configured to detect the user terminal; and
    the address obtaining unit is configured to obtain the address information from the detected user terminal.

9. The information processing system as claimed in claim 6, wherein when the process indicated by the information of the process flow is a scanning process,
    the function control unit causes the apparatus to scan a document to obtain image data, and
    the linkage unit sends the obtained image data to the management apparatus.

10. The information processing system as claimed in claim 6, wherein when the process indicated by the information of the process flow is a printing process, the function control unit causes the apparatus to perform the printing process based on print data sent from the management apparatus.

11. A method performed by an apparatus that executes at least one process in a process flow, the method comprising:
    storing terminal information of at least one of user terminals which stores address information;
    receiving an operation input by a user of the apparatus;
    obtaining information of the process flow stored in a management apparatus, accessed based on the address information obtained from the user terminal selected from among the terminal information by the received operation;
    performing at least one process of the process flow; and sending a result of the process to the management apparatus.

12. The method as claimed in claim 11, further comprising:
obtaining the address information of the management apparatus from the user terminal selected by the received operation;
determining whether access to the management apparatus corresponding to the obtained address information is allowed by referring to sets of address information stored in a storage unit of the apparatus,
wherein the information of the process flow is obtained from the management apparatus if it is determined that the access to the management apparatus is allowed.

13. The method as claimed in claim 12, further comprising:
detecting the user terminal;
and
obtaining the address information from the detected user terminal.

14. The method as claimed in claim 11, wherein when the process indicated by the information of the process flow is a scanning process, the apparatus scans a document to obtain image data and sends the obtained image data to the management apparatus.

15. The method as claimed in claim 11, wherein when the process indicated by the information of the process flow is a printing process, the apparatus performs the printing process based on print data sent from the management apparatus.

\* \* \* \* \*